(No Model.)

G. W. PASSEL.
WOOD WORKER.

No. 403,368. Patented May 14, 1889.

Attest:
C. W. Bogart.
L. E. Hosea.

Inventor.
George W. Passel
By R. M. Hosea Atty.

UNITED STATES PATENT OFFICE.

GEORGE W. PASSEL, OF CINCINNATI, OHIO, ASSIGNOR TO J. A. FAY & COMPANY, OF OHIO.

WOOD-WORKER.

SPECIFICATION forming part of Letters Patent No. 403,368, dated May 14, 1889.

Application filed July 14, 1888. Serial No. 279,997. (No model.)

*To all whom it may concern:*

Be it known that I, GEORGE W. PASSEL, a citizen of the United States, residing at Cincinnati, Hamilton county, Ohio, have invented new and useful Improvements in Wood-Workers, of which the following is a specification.

My invention relates to the class of hand planing and molding machines commonly known as "wood-workers," which embody a cutter-head mounted upon an arbor centrally between and below two work-carrying platens; and its object is to improve the machine in respect to the bearings of the cutter-arbor by the construction and arrangement of a double bearing for the pulley end of the same, whereby the side strains of the otherwise overhanging driving-pulley are relieved, and by the adjustment of which the arbor may be shifted longitudinally in its front or third bearing to vary the relation of the cutter-head to the work.

In my improvement the arbor is provided with bearings at either side of the drive-pulley, connected together upon a rigid frame gibbed upon the supporting-bed of the machine in a guideway parallel with the arbor, and furnished with means for adjustment, constituting a yoke for shifting the arbor, besides a rigid double bearing, as indicated.

Mechanism embodying my invention is exhibited in the accompanying drawings, in which—

Figure 1:
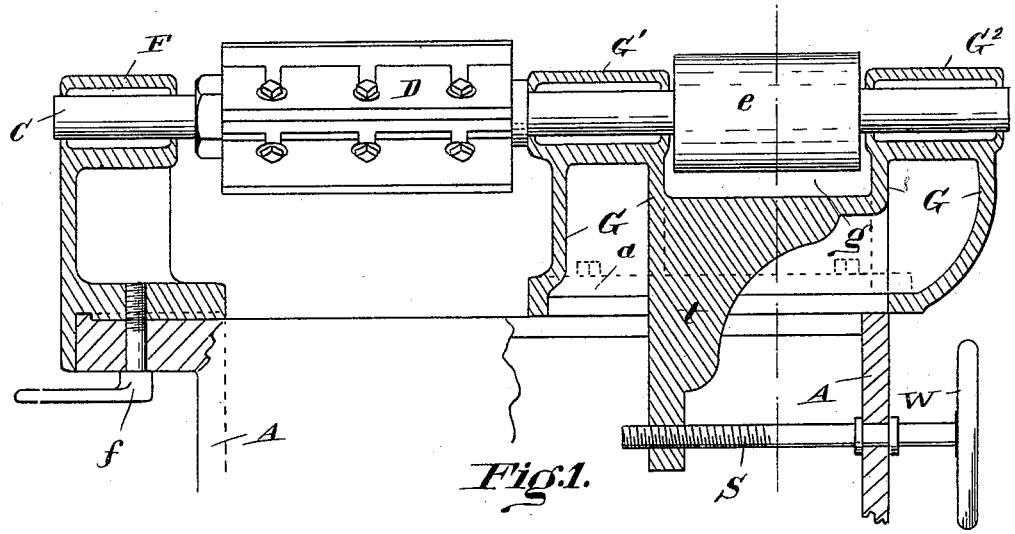
Figure 2:
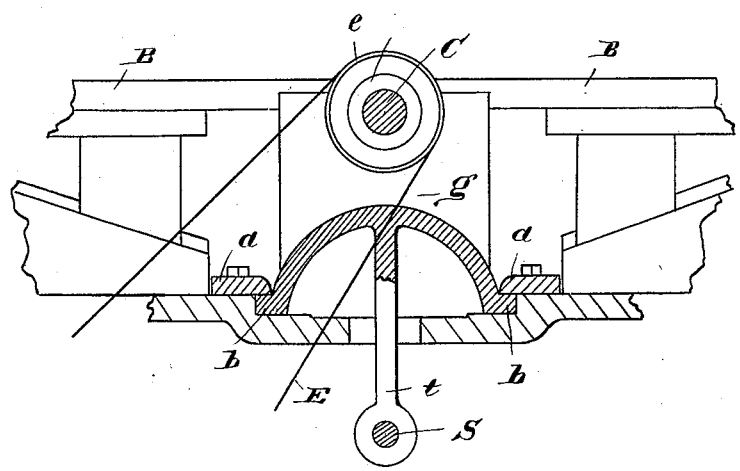

Figure 1 is a cross-section of the machine in the axial plane of the cutter-arbor. Fig. 2 is a cross-section of the adjustable bearing-frame in the plane $x$ $x$ of Fig. 1.

Referring now to the drawings, A designates the supporting frame or bed of the machine, B B the adjustable platens, and C the cutter-arbor, carrying the cutter-head D and the driving-pulley $e$. The latter practically overhangs the supporting-bed, and is driven by an outside belt at the rear.

The front bearing, F, is detachably secured to the supporting frame or bed A by a screw-clamp, $f$, or otherwise, in order that the same may be removed when necessary to replace the cutter-head, thus enabling the substitution to be made without removing the arbor from the machine.

The two remaining bearings, $G'$ $G^2$, are cast as parts of a yoke-frame, G, having a central depression, $g$, in which the belt-pulley E plays and which affords space for the belt. The yoke-frame G is secured to the supporting-bed A by gibs $a$ $a$, and has a central downward projection or tongue, $t$, to receive an adjusting-screw, S, passing through a suitable socket in the rear wall of the bed A, and provided with an external hand-wheel, $w$, by which the proper adjustments may be made. The frame G thus affords bearings for the arbor on both sides of the belt-pulley, and at its base is extended into lateral flanges $b$, by which it has a sliding bearing upon the bed, and is held by the gibs $a$.

The bearings proper constitute, also, the jaws of a yoke spaced apart by the drive-pulley, so that the adjustment of the bearing-frame in its sliding bearing also carries the arbor longitudinally in its front bearing and shifts the cutter in relation to the work. Said double end bearing overhangs the frame to some extent and carries an outside pulley-connection; yet the mandrel is not subject to any lateral strain ordinarily incident to an overhanging pulley-connection.

I claim as my invention and desire to secure by Letters Patent of the United States—

1. In a wood-worker of the character described, in combination with the cutter-arbor, its cutter-head, and driving-pulley, a detachable but relatively-fixed front bearing for said arbor, and two adjustable bearings, one intermediate between the cutter-head and belt-pulley and the other terminal beyond the belt-pulley, said two latter bearings being adjustable upon the bed of the machine to determine the position of the cutter-head, substantially as set forth.

2. In a wood-worker, in combination with the cutter-arbor and its drive-pulley, a yoke-frame affording rigidly-connected bearings for the arbor at each side of the drive-pulley and adjustable upon the supporting-bed in the line of the arbor to vary the position of the latter longitudinally in its front or fixed bearing, substantially as set forth.

In testimony whereof I have hereunto set my hand in the presence of two subscribing witnesses.

GEORGE W. PASSEL.

Witnesses:
   L. M. HOSEA,
   L. E. HOSEA.